United States Patent Office 3,468,724
Patented Sept. 23, 1969

3,468,724
METAL COATING PROCESS
Earl R. Reinhold, Levittown, Pa., assignor to Amchem Products Inc., Ambler, Pa., a corporation of Delaware
No Drawing. Filed Mar. 31, 1966, Ser. No. 538,942
Int. Cl. C23f 7/10, 7/12
U.S. Cl. 148—6.15                           12 Claims

ABSTRACT OF THE DISCLOSURE

A process for treating ferriferous and zinc metal surfaces to enhance their corrosion resistant and paint-bonding characteristics wherein the surface is contacted with an aqueous solution containing from 0.01 to about 10 grams/liter of a metal selected from the group consisting of nickel and cobalt, and from 0.1 to about 100 grams/liter of an acid anion selected from the group consisting of sulfate, chloride, sulfamate, citrate, lactate, acetate, and glycolate, the pH of said aqueous treating solution being maintained between about 0.1 and 4.

---

This invention relates to the art of finishing zinciferous and ferriferous surfaces, and, more particularly, relates to a process and solutions for providing a final finish on metal surfaces. Hereinafter, in the specification as well as the claims appended hereto, a reference to "zinc" surfaces will be understood to include alloys of zinc wherein zinc is the principal ingredient, hot-dipped galvanized surfaces, and electro-deposited zinc coatings, as well as relatively pure zinc surfaces.

The principal object of this invention is the provision of a treatment and treating solutions for metal surfaces which produce greatly enhanced adhesion of subsequently applied finishes such as paint, varnish, lacquer, japan or the like, the improved adhesive properties of the treated surfaces thus extending the life of such later applied finishes under conditions where they may be subjected to atmospheric corrosion or mechanical strain.

A further object of the present invention is the provision of a process and solutions for providing a final finish on metal surfaces, which finish materially improves the corrosion resistance of such surfaces, especially when the surfaces are painted.

Yet another object of this invention is the provision of a treatment for metal surfaces which results in the surface having a very high luster after the application of very thin coatings of paint or the like.

It is an object of this invention to provide a treatment for metal surfaces which facilitates the later application of conversion coatings, such as phosphate coatings and chromate coatings, to the surface, and which improves the paint bonding properties of such later applied coatings.

The present invention is based upon the discovery that if metal surfaces are subjected to the action of an aqueous acid solution containing at least 0.01 gram/liter of a metal ion selected from the class consisting of nickel and cobalt, plus an acid anion selected from the class consisting of sulfate, chloride, sulfamate, citrate, lactate, acetate and glycolate, the solution being maintained at a pH of from 0.1 to 4.0, such surfaces, following water rinsing or other after treatment, will be found to possess an exceptionally high degree of adhesion for subsequently applied siccative finishes, or for chemical conversion coatings which in turn are given a final siccative finish.

The treatment of the present invention does not result in the formation of an electrically insulating coating on the surface of the metal, and thus is a particularly useful treatment for metal surfaces which are painted with electrophoretically applied paints. Such paint coatings are extremely thin, and benefit greatly from the superior paint adhesion properties obtained in accordance with the invention.

The amount of metal ion from the class consisting of nickel and cobalt which is dissolved in the aqueous acid treating solution must, as noted above, be at least 0.01 gram/liter. Where less than this minimum amount of nickel or cobalt is employed, the improved adhesion properties for siccative finishes which are otherwise possible by the process of this invention will not be realized. So far as an upper limit of metal ion concentration is concerned, it has been found that no apparent maximum limitation exists up to the saturation level of the metal ion employed. However, in the interests of economy and to prevent waste it is preferred to utilize no more than about 10 grams of nickel and/or cobalt ion per liter of coating solution, since the improvement in result obtained from the use of higher concentrations is not commensurate with the added cost of establishing and maintaining such concentrations.

The essential acid anion must be selected from the class consisting of sulfate, chloride, sulfamate, citrate, lactate, acetate and glycolate. The concentration of acid anion must be at least 0.1 gram/liter in order to insure obtaining the desired adhesion properties of the treated metal surfaces.

When the concentration of the acid anion is increased, it is generally accompanied by an increase in the rate of activity or rate of attack of the solution on the metal surface being treated. It is desirable to have an activity of the solution sufficient to produce a mild etching action on that surface. However, if the concentration of the acid anion is so large it raises the activity of the solution to the point where the metal surface is being attacked more rapidly than the protective finish sought to be formed can be established, then the advantages which the invention yields will be lost. The point at which this undesirable condition is reached will vary, depending upon the kind of metal surface being treated, the type of acid anion component used, and the other operating conditions.

Some examples may be given to illustrate the effect of high acid anion concentration and the manner in which it various with the type of metal being treated. Thus when a solution of 0.5 gram/liter of nickel and 500 grams/liter of sulfate was used to treat cold-rolled mild steel, it was found that the improved paint adhesion properties characteristic of the invention were equal to those obtained when the concentration of sulfate was reduced to 1.0 gram/liter.

However in another test, a treating solution of 0.5 gram/liter of nickel and 250 grams/liter of sulfuric acid were used to treat a zinc surface of the hot-dipped full-spangled type. With this solution the rate of attack on the zinciferous surface was so great that all of the zinc was removed in 10 seconds. When the concentration of sulfuric acid was reduced to 100 or less grams/liter a protective coating or deposit was obtained, as evidenced by the superior paint adhesion properties of the treated surfaces.

Because of the considerations outlined above, no single absolute upper concentration of acid anion component can be established which is applicable to every acid anion and every type of surface. Nonetheless, based on these same considerations, a conservative upper safe limit for the acid concentration can be stated generally. This level is about 100 grams/liter. If the concentration of the acid anion is held below this preferred safe upper limit, the advantages of the invention will not be lost by reason of severe attack upon the metal surface.

The acid anion component concentration is related to another aspect of the invention, namely, the pH of the solution. As explained below, when the pH is too low, the activity of the solution is so great that the advantages of the invention are lost. The relationship between the acid anion component concentration and the pH is particularly close when the acid anion is supplied in the solution as the free acid. In such solutions, and to a lesser extent in solutions where the anion is supplied as a salt, maintenance of the pH above the lower limit of 0.1 discussed below will more or less automatically result in the establishment of a safe and satisfactory level of acid anion component concentration.

The preferred acid anion is sulfate, since it has been found that optimum adhesion properties are realized with the use of this particular ion. Chloride, sulfamate, citrate, lactate, acetate, and glycolate do not produce coatings of the same excellent caliber as those resulting from sulfate baths. Nevertheless their use produced surfaces displaying adhesion properties appreciably improved over those realized with conventional phosphate or chromate coatings on metal surfaces. The effectiveness of the acid anions other than sulfate in the solutions of the invention varies somewhat, although all are fully operative. Thus, among the inorganic anions sulfamate is superior to chloride. Among the organic anions, glycolate and lactate are superior to the remaining anions. Overall ranking of the anions in order of effectiveness in the solutions of the invention is as follows: sulfate, sulfamate, chloride, glycolate, lactate, citrate and acetate.

In addition to the required acid anion, it is also essential that the solution pH be maintained between the values of 0.1 and 4.0. If the solution pH is permitted to fall below 0.1, it will be observed that while a deposit of nickel or cobalt is produced upon the metal surfaces, the acidity of the solution will be such that the deposit is redissolved and reprecipitated with a constant dissolution of the underlying metal surfaces, whereby resulting in unnecessary loss of metal from the article being treated and loss of the advantages of the invention. Conversely, where the solution pH is permitted to rise above 4.0, little or no nickel or cobalt is deposited upon the metal surfaces so that improved adhesion properties are not realized upon subsequent application of siccative finishes.

A preferred pH range has been found to be from 1.2 to 1.7 since improved consistency of nickel or cobalt deposition is realized within this narrow range, and optimum adhesion results are obtained when operating within this narrow pH range.

The nickel and/or cobalt ions may be introduced into the treating solutions by means of water soluble salts thereof such as, for example, the nitrate salts

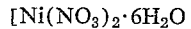

[$Ni(NO_3)_2 \cdot 6H_2O$ and $Co(NO_3)_2 \cdot 6H_2O$]. The acidic anion components may be introduced into the treating solutions in the form of their free acids, or as water soluble salts thereof. Where salts are utilized it may become necessary to effect a pH adjustment so as to insure maintenance of the required pH operating range. Generally, such pH adjustments can be effected utilizing the free acid of the particular acidic anion employed in the treating solution. Standard glass electrode pH measurements have been found to be completely suitable in this respect.

Metal surfaces which are to undergo treatment with nickel and/or cobalt containing-acid solutions of the present invention should be free of heavy oil or soil deposits. Where pre-cleaning is desired this may be effected in accordance with standard prior art practices which in themselves form no part of this invention.

Treatment of metal surfaces in the nickel and/or cobalt containing acidic solutions of this invention may be accomplished anywhere from room temperature, that is from about 22° C., to the boiling point of the particular solution used. A preferred temperature range has been found to be from 65° C. to 95° C. since optimum results appear to be obtained within this range.

The time of treatment has not been found to be critical, and may vary depending upon the temperature and/or the concentration of the essential constituents dissolved in the acid treating solutions. Generally, where the nickel and/or cobalt concentration is near the low limit, somewhat longer treating times are preferred; and conversely, where the metal ion concentration is relatively high, a shorter treating cycle is sufficient. The main consideration in operating the process of the present invention is that the metal surfaces are thoroughly contacted by the treating solutions of this invention, in order that the enhanced adhesion results will be obtained on the treated metal.

In general, the addition of other anions to the treating solution should be avoided, because it has been found that an inhibiting effect is obtained where acid anions, other than the ones included herein, have been used. Several exceptions, however, have been noted. The addition of nitrate, as for example nickel or cobalt nitrate, does not appear to have any adverse effect upon the action of the treating solutions. However, nitrate alone, without the addition of one or more of the other acid anions specified, does not provide the desired coatings.

The only other anion which I have found to be tolerable in the treating solutions of this invention, that is, the only other anion which does not inhibit nickel or cobalt deposition, is hexavalent chromium. I have further discovered that there is a considerable benefit to be gained from the inclusion of this anion in the treating solutions. The acidic treating solutions of the invention are normally corrosive to the vessels containing them, but I have found such corrosion can be substantially minimized or reduced if the treating solution contains hexavalent chromium, calculated as $CrO_3$.

The amount of hexavalent chromium to be added to the treating solutions of this invention will vary, depending upon the type of metal used in constructing the tanks utilized with these solutions. For example, where a relatively corrosion resistant metal is employed, such as certain of the stainless steel alloys or the nickle-chrome alloys, the amount of hexavalent chromium ion which needs to be incorporated may be as little as a few hundredths of a percent, based on the total volume of the solution. Conversely, where the metal tank is of a low carbon steel type which is more readily corrodible by the treating solutions of this invention, the amount of hexavalent chromium ion, calculated as $CrO_3$, will necessarily be higher. It is only preferred that sufficient hexavalent chromium ion, calculated at $CrO_3$, be added to the acid treating solutions of this invention so as to retard effectively the corrosive attack upon the metal tanks.

I have found that utilization of from about 0.001% to about 4% weight/volume (grams/100 mls. or pounds/gallons) of hexavalent chromium, calculated as $CrO_3$, is sufficient to retard or minimize the corrosive attack of the treating solutions of this invention upon a wide variety of metal types utilized in equipment construction. chromium ions within this concentration range does not interfere with the coating producing qualities of the solutions, but does effectively inhibit corrosion of the metal vessels containing these solutions.

Following treatment of the metal surfaces in the acidic, nickel and/or colbalt containing solution, it is important that a thorough water rinse be utilized so as to avoid the carry-over of acidic components into subsequent treating states. As will be pointed out below, one desirable after-treatment, in accordance with the invention, is a dilute chromate rinse. In some installation this rinse may be applied in a system wherein the rinsing solution is used only once, and then discarded. In such installations the preferred water rinse may be omitted, since the single use of the dilute chromate rinse makes the carry-over of acidic components into it relatively unimportant. However, for those situations where no after-treatment is to be given to the surfaces before they are painted, or where an after-treatment consisting of contact with a recirculating bath, such as a chromate rinse or conversion coating bath, is used, it is preferred that a thorough water rinse be used to remove the acidic components from the surface.

In accordance with the invention, several forms of after-treatment are available for full exploitation of the advantages of the invention. The particular after-treatment employed in a given situation will, of course, depend upon the particular goals sought.

One after-treatment consists of a thorough water rinse of the treated surface, following which it is dried and given a siccative finish. This procedure results in the production of surfaces having very good paint adhesion properties and has the advantage that only a single treating stage involving the use of chemicals is involved.

Another after-treatment involves rinsing the treated surfaces with a solution containing a dilute concentration of hexavalent chromium ions following which the surfaces are dried and given a final decorative finish. As pointed out above, the dilute chromate rinse may be preceded by a water rinse. The use of a dilute acidulated chromate rinse is preferred over other after-treatments, since the combination of treatment with the nickel and/or cobalt containing solutions of the invention followed by a dilute chromate rinse has been found to produce surfaces with excellent paint adhesion properties at minimum economic cost.

For some applications it may be desirable to follow the treatment of the surface with nickel and/or cobalt solutions with another chemical treatment of the kind known in the art as conversion coating. The advantages provided in accordance with the invention differ somewhat depending on the type of conversion coating applied, so these will be discussed separately.

As is known, it is difficult to apply phosphate conversion coatings to galvanized surfaces, and the coatings produced are marginal in quality. I have found that if such galvanized surfaces are first treated with nickel and/or cobalt containing solutions as outlined above, and then treated with conventional phosphate coating solutions, the application of the phosphate coating is much more easily accomplished, and the resulting treated surfaces has paint adhesion and corrosion resistance properties superior to surfaces which have received only a phosphate coating.

On some occasions it is desirable to apply a chromate conversion coating to the surface. I have found that if a combination of treatments consisting first, of treatment of the surface with nickel and/or cobalt containing solutions, and second, with a conventional chromate conversion coating, is utilized, a great improvement in the paint adhesion and corrosion properties of the surface is obtained over surfaces which have been chromate coated only. Furthermore, I have found that prior treatment of the surface with nickel and/or cobalt containing solutions automatically limits the weight of the after applied chromate coating to the optimum weight for producing the desired properties which chromate coating yields. Stated differently, prior treatment of surfaces with the solutions of the present invention makes possible the most efficient application of a chromate finish to the surface.

It should be noted, in connection with both classes of after applied conversion coatings, that for many applications they can be omitted, because the preferred treatment with nickel and/or cobalt containing solutions and a dilute chromate rinse after-treatment will produce a surface with excellent paint adhesion and corrosion resistance properties meeting all of the requirements of the user.

In order to illustrate the enhanced adhesion results which are obtained with the process of the present invention there are presented below a series of results which are intended solely as examples of the process and solutions described herein, and which are in no way intended to be construed as in any way limiting the scope of this invention.

Example I

Galvanized steel panels were subjected to the action of an aqueous acid solution containing the following:

$$\text{Grams}$$
$$NiSO_4 \cdot 6HOH \text{ ---------------------------------- } 2.25$$
$$H_2SO_4 \text{ (66° Bé.) ---------------------------------- } 3.68$$
Water, to make 1 liter.

The galvanized steel panels were subjected to this solution at a temperature of 66° F. for a period of 15 seconds. After treatment, the panels were rinsed in cold water, dried and then painted with an acrylic finish. Subsequent adhesion as determined by standard Impact Test (utilizing both the Olsen Cup Test and the Impact Test, as described below) showed considerable improvement over galvanized steel panels which had no similar treatment.

Further improvement in adhesion was realized by subjecting galvanized steel panels to the treatment as described above and applying a dilute aqueous chromate solution which may advantageously also contain trivalent chromium, immediately prior to application of the above mentioned acrylic finish. Subsequent tests showed excellent paint adhesion.

Additional tests were run on galvanized steel (zinc), and on steel surfaces. Results of these tests, all of which were run at 66° C. utilizing contact times of 15 seconds, are reported in the following table.

TABLE I

| Ex. | Metal Treated | Metal Ion Type | G./l. | Acid Anion Type | G./l. | pH | Inhibitor added $CrO_3$, g./l. | Final treatment | Adhesion Olsen [1] | Impact [2] |
|---|---|---|---|---|---|---|---|---|---|---|
| 1 | Zinc | | | | | | | $CrO_3$ | Poor | Poor. |
| 2 | do | Ni | 0.5 | | | 4.2 | | $CrO_3$ | do | Do. |
| 3 | do | | | $SO_4$ | 6.5 | 1.2 | | $CrO_3$ | do | Do. |
| 4 | do | Ni | 0.1 | $PO_4$ | 5.0 | 1.7 | | $CrO_3$ | do | Do. |
| 5 | do | Ni | 0.1 | $SO_4$ | 25.0 | 0.1 | | $CrO_3$ | Excellent | Excellent. |
| 6 | do | Ni | 1.0 | $SO_4$ | 3.68 | 1.4 | | $CrO_3$ | do | Do. |
| 7 | do | Ni | 5.0 | $SO_4$ | 1.84 | 1.7 | 0.01 | | do | Do. |
| 8 | do | Ni | 10.0 | $SO_4$ | 3.68 | 1.0 | 40 | | do | Do. |
| 9 | Steel | Ni | 0.01 | $SO_4$ | 6.44 | 1.2 | 1.3 | | do | Do. |
| 10 | do | Ni | 0.1 | Cl | 5.0 | 1.4 | 1.3 | $CrO_3$ | do | Do. |
| 11 | do | Ni | 0.1 | $NH_2SO_3$ | 5.0 | 1.7 | 1.3 | $CrO_3$ | do | Do. |
| 12 | do | Ni | 0.2 | $SO_4$ | 1.0 | 2.2 | 1.3 | $CrO_3$ | do | Do. |
| 13 | Zinc | Co | 0.1 | $SO_4$ | 25.0 | 0.1 | 1.3 | $CrO_3$ | do | Do. |
| 14 | do | Co | 10.0 | $SO_4$ | 0.2 | 4.0 | | | do | Do. |
| 15 | Steel | Co | 0.5 | $SO_4$ | 25.0 | 0.1 | 1.3 | $CrO_3$ | do | Do. |
| 16 | do | Co | 1.0 | Cl | 3.5 | 0.4 | | $CrO_3$ | do | Do. |
| 17 | do | | | | | | | $CrO_3$ | Poor | Poor. |

[1] Olsen Cup Test comprises deformation of the treated metal to 250 mils utilizing a ⅞ inch diameter ball.
[2] The Impact Test comprises impacting the test articles by a falling ½ inch diameter ball with a force of from 20 to 60 inch-pounds. After impact, the deformed surface is inspected for loose or cracked paint, usually on the reverse side of the impact, and rated descriptively. The degree of deformation, and accordingly the severity of any given force of impact, is dependent upon the thickness of the specimen.

In order to illustrate the effect of the process and solutions of the present invention on both galvanized steel and steel surfaces, where there was utilized organic acid anions rather than the inorganic acid anions described heretofore, there is presented below a table of test results obtained from the utilization of such anions and wherein all of the tests were performed at temperatures of 66° C. utilizing contact times of 30 seconds, and wherein the individual test solutions all had pH values between 1.2 and 1.7.

TABLE II

| Ex. | Metal Treated | Metal Ion Type | G./l. | Acid Anion Type | G./l. | Final treatment | Adhesion Olsen [1] | Impact [1] |
|---|---|---|---|---|---|---|---|---|
| 18 | Zinc | Ni | 0.5 | Citric | 10 | $CrO_3$ | Excellent | Excellent. |
| 19 | do | Ni | 0.5 | Lactic | 10 | $CrO_3$ | ----do---- | Do. |
| 20 | do | Ni | 0.5 | Acetic | 10 | $CrO_3$ | ----do---- | Do. |
| 21 | do | Ni | 0.5 | Glycolic | 10 | $CrO_3$ | ----do---- | Do. |
| 22 | do | Ni | 0.5 | Oxalic | 10 | $CrO_3$ | Poor | Poor. |
| 23 | do | Ni | 0.5 | Gluconic | 10 | $CrO_3$ | ----do---- | Do. |
| 24 | do | Ni | 0.5 | Tartaric | 10 | $CrO_3$ | ----do---- | Do. |
| 25 | do | | | | | $CrO_3$ | ----do---- | Do. |

[1] As explained above.

From the foregoing results it is clearly apparent that the process of the present invention permits attainment of appreciably enhanced adhesion properties on metal surfaces.

I claim:

1. A method for treating ferriferous and zinc metal surfaces to improve their paint adhesion and corrosion resistance properties, comprising: contacting said surface with an aqueous solution consisting essentially of 0.01 gram/liter to about 10 grams/liter of a metal ion selected from the class consisting of nickel and cobalt, and 0.1 gram/liter to about 100 grams/liter of an acid anion selected from the class consisting of sulfate, chloride, sulfamate, citrate, lactate, acetate, and glycolate, and maintaining the pH of the solution between about 0.1 and 4.0 when treating said zinc surface and between about 0.1 and 1.7 when treating said ferriferous surface.

2. A method in accordance with claim 1 in which said aqueous solution further comprises from about 0.001% to about 4% hexavalent chromium, calculated as $CrO_3$.

3. A method in accordance with claim 1 in which said maintenance of the pH is performed by adding to said solution the free acid of the acid anion employed in the solution.

4. A method in accordance with claim 1 and further comprising the steps of rinsing said surface with water following the contacting thereof with said aqueous solution, and thereafter applying a coating to said surface by contacting it with a phosphate coating solution.

5. A method in accordance with claim 1 and further comprising steps of rinsing said surface with water following the contacting thereof with said aqueous solution and thereafter applying a coating to said surface by contacting it with a chromate coating solution.

6. A method in accordance with claim 1 and further comprising the step of rinsing said surface, following the contacting thereof with said aqueous solution, with a dilute acidulated rinse containing hexavalent chromium.

7. A method in accordance with claim 1 in which the concentration of said acid anion is at least 1.0 gram/liter but insufficient to cause severe etching of said surface.

8. A method in accordance with claim 1 in which the pH of said aqueous solution is maintained between about 1.2 and about 1.7.

9. A method in accordance with claim 1 in which the temperature of said aqueous solution is maintained between about 65° C. and 95° C.

10. An aqueous solution for treating ferriferous and zinc metal surfaces to improve their paint adhesion and corrosion resistance properties consisting essentially of: 0.01 gram/liter to about 10 grams/liter of a metal ion selected from the class consisting of nickel and cobalt, and 0.01 gram/liter to about 100 grams/liter of an acid anion selected from the class consisting of sulfate, chloride, sulfamate, citrate, lactate, acetate, and glycolate, said solution having a pH between about 0.1 and 1.7.

11. A solution in accordance with claim 10 and further comprising from about 0.001% to about 4% hexavalent chromium calculated as $CrO_3$.

12. A solution in accordance with claim 10 in which the pH of said solution is between about 1.2 and about 1.7.

References Cited

UNITED STATES PATENTS

| 2,097,211 | 10/1937 | Davies | 148—6.15 X |
| 2,101,950 | 12/1937 | McGohan. | |
| 2,169,584 | 8/1939 | Kelley | 148—6.2 |
| 2,314,565 | 3/1943 | Thompson | 148—6.16 |

FOREIGN PATENTS 547,408   8/1942   Great Britain.

OTHER REFERENCES

Canfield: Growth of Nickel Flashing, Reprint from Finish, November 1954, pp. 1–4.

Wesley et al.: Trans. Electrochem. Soc., vol. 94, No. 1, July 1948, pp. 20, 21, 22, 27, 28, 30 and 31.

RALPH S. KENDALL, Primary Examiner

U.S. Cl. X.R.

106—1; 117—71, 93.4, 130; 148—6.2, 6.16

PO-1050
(5/69)

UNITED STATES PATENT OFFICE
CERTIFICATE OF CORRECTION

Patent No. 3,468,724　　　　　　　　Dated September 23, 1969

Inventor(s)　　　　　　Karl R. Reinhold

It is certified that error appears in the above-identified patent and that said Letters Patent are hereby corrected as shown below:

Column 4, line 55, insert before "chromium" --The inclusion in the treating solutions of hexavalent--.

SIGNED AND
SEALED
FEB 17 1970

(SEAL)
Attest:

Edward M. Fletcher, Jr.
Attesting Officer

WILLIAM E. SCHUYLER, JR
Commissioner of Patents